(12) United States Patent  
Heller, Jr.

(10) Patent No.: US 8,862,786 B2  
(45) Date of Patent: Oct. 14, 2014

(54) PROGRAM EXECUTION WITH IMPROVED POWER EFFICIENCY

(75) Inventor: Thomas J. Heller, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 12/550,896

(22) Filed: Aug. 31, 2009

(65) Prior Publication Data

US 2011/0055831 A1 Mar. 3, 2011

(51) Int. Cl.
 *G06F 9/46* (2006.01)
 *G06F 1/28* (2006.01)
 *G06F 1/32* (2006.01)
 *G06F 9/50* (2006.01)

(52) U.S. Cl.
 CPC ............ *G06F 9/5094* (2013.01); *Y02B 60/142* (2013.01); *G06F 1/329* (2013.01)
 USPC ................. 710/5; 710/15; 710/267; 713/300; 713/320; 713/340; 718/100; 718/102; 718/104

(58) Field of Classification Search
 None
 See application file for complete search history.

(56) References Cited

U.S. PATENT DOCUMENTS

| | | | |
|---|---|---|---|
| 5,142,684 A | 8/1992 | Perry et al. | |
| 6,317,840 B1 * | 11/2001 | Dean et al. | 713/320 |
| 6,574,738 B2 * | 6/2003 | Jain et al. | 713/300 |
| 2003/0115428 A1 * | 6/2003 | Zaccarin et al. | 711/156 |
| 2003/0126476 A1 * | 7/2003 | Greene | 713/300 |
| 2006/0294401 A1 * | 12/2006 | Munger | 713/300 |
| 2007/0250731 A1 * | 10/2007 | Romero et al. | 713/324 |
| 2009/0164814 A1 * | 6/2009 | Axford et al. | 713/320 |
| 2009/0313490 A1 * | 12/2009 | Tani | 713/320 |
| 2011/0055831 A1 * | 3/2011 | Heller, Jr. | 718/100 |
| 2011/0239015 A1 * | 9/2011 | Boyd et al. | 713/320 |
| 2011/0239016 A1 * | 9/2011 | Boyd et al. | 713/320 |

* cited by examiner

*Primary Examiner* — Tanh Nguyen
(74) *Attorney, Agent, or Firm* — Cantor Colburn LLP; Margaret McNamara (57) ABSTRACT

Program execution with improved power efficiency including a computer program that for performing a method that includes determining a current power state of a processor. Low power state instructions of an application are executed on the processor in response to determining that the current power state of the processor is a low power state. Executing the low power state instructions includes collecting hardware state data, storing the hardware state data, and performing a task. High power state instructions of the application are executed on the processor in response to determining that the current power state of the processor is a high power state. Executing the high power state instructions includes performing the task using the stored hardware state data as an input.

12 Claims, 5 Drawing Sheets

PROGRAM EXECUTION WITH IMPROVED POWER EFFICIENCY

BACKGROUND

This invention relates generally to processing within a computing environment, and more particularly to improving power efficiency in a computing environment.

Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the interconnect interface(s).

Extensive research and development efforts are invested by the industry, on an ongoing basis, to create improved and/or innovative solutions to maximize overall computer system performance and density by improving the system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the computer system design challenges, and include such items as ease of upgrade and reduced system environmental impact (such as space, power, and cooling).

As the performance of processors continues to increase, the amount of power consumed by the processors is also likely to continue to increase. The amount of power that can be consumed by a given processor is often limited by a variety of factors such as the operating environment of the processor. Thus, improvements in processor performance may be gated by the additional power required by the processor to implement the improvements.

BRIEF SUMMARY

An exemplary embodiment is a computer program product for optimizing power performance in a computer system. The computer program product includes a tangible storage medium readable by a processing circuit and storing instructions for execution by the processing circuit for performing a method. The method includes determining a current power state of a processor. Low power state instructions of an application are executed on the processor in response to determining that the current power state of the processor is a low power state. The application performs a task on the processor, and includes both the low power state instructions and high power state instructions. Executing the low power state instructions includes collecting hardware state data, storing the hardware state data, and performing the task. The high power state instructions are executed on the processor in response to determining that the current power state of the processor is a high power state. Executing the high power state instructions includes performing the task using the stored hardware state data as an input.

Another embodiment is a computer program product for optimizing power performance in a computer system. The computer program product includes a tangible storage medium readable by a processing circuit and storing instructions for execution by the processing circuit for performing a method. The method includes determining if a task has been identified as a high power state task. The task is dispatched to the processor as a high power state task in response to determining that the task has been identified as a high power state task. The dispatching the task to the processor as a high power state task includes determining if the processor can support a high power state, the determining responsive to hardware state data; and executing high power state instructions of an application code on the processor in response to determining that the processor can support a high power state. The application code includes the high power state instructions and low power state instructions. The task is dispatched to the processor as a low power state task in response to determining that the task has not been identified as a high power state task. Dispatching the task to the processor as a low power state task includes executing the low power state instructions.

A further exemplary embodiment is a computer implemented method for optimizing power performance in a computer system. The method includes determining a current power state of a processor. Low power state instructions of an application are executed on the in response to determining that the current power state of the processor is a low power state. The application performs a task on the processor, and includes both the low power state instructions and high power state instructions. Executing the low power state instructions includes collecting hardware state data, storing the hardware state data, and performing the task. The high power state instructions are executed on the processor in response to determining that the current power state of the processor is a high power state. Executing the high power state instructions includes performing the task using the stored hardware state data as an input.

A further exemplary embodiment is a system for optimizing power performance in a computer system. The system includes a computer memory and a processor in communication with the computer memory. The processor includes an instruction fetching element for fetching instructions from memory and one or more execution elements for executing fetched instructions. The computer system is capable of performing a method. The method includes determining a current power state of a processor. Low power state instructions of an application are executed on the in response to determining that the current power state of the processor is a low power state. The application performs a task on the processor, and includes both the low power state instructions and high power state instructions. Executing the low power state instructions includes collecting hardware state data, storing the hardware state data, and performing the task. The high power state instructions are executed on the processor in response to determining that the current power state of the processor is a high power state. Executing the high power state instructions includes performing the task using the stored hardware state data as an input.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for power/performance optimization of a multiprocessor system by using application code that is responsive to power and/or performance attributes of the hardware that it is executing on. As used herein, the term "power/performance" refers to a measurement of the efficiency of power consumption (e.g., electrical power consumption) in a computer system such as a multiprocessor system or a processor.

Optimizing a large multiprocessor system for peak performance per watt is often difficult with contemporary software and hardware. Systems may include multiple processing elements that have a variety of power/performance operating points (also referred to herein as "power states") packaged together in a single package or connected via cache coherent links among multiple packages. Current dispatching algorithms are used to dispatch processes to processing elements based upon the goal of achieving peak performance. Some systems have severe limitations on the highest possible power dissipation allowed by the room environment where they are housed.

An exemplary embodiment provides a software application for performing a task that takes different code paths depending on the power state of the processor core that it is executing on. A program interface is provided which allows an application to check the power state of the hardware before executing a task on the hardware. The result of this check is used to determine if an extra set of code should be executed along with the code to execute the task. This "additional code" is selected to provide a power/performance advantage when run on hardware which exceeds a certain threshold of power/performance (e.g., at a threshold power state). The overall goal is to optimize the power/performance of a number of repeated executions of the same code when it is known that the code will run on a variety of processor core types.

One specific application implemented by an exemplary embodiment is a dispatching algorithm for the dispatch of virtual processors. Two or more distinct paths through the dispatching code are provided. The first "high power" path is the typical, very fast path which selects the next tasks for dispatch. This first path is executed when the code detects that it is running on a high performance, high power core (e.g., the processing core is in a high power state). The second path is a new "preprocessing path" which is executed when the dispatching code detects that it is running on a core that has lower performance but much better power/performance (when compared to the high power path). The code in the second path includes collecting information from the hardware about the state of the processor and/or the multiprocessor system hardware as it relates to the power and/or performance of the system. The additional code sorts through information that provides for more informed power/performance choices when the high power path is executed. The intermediate results are stored somewhere (e.g., in a register, in a cache, etc.) where the next instance of running through the high power path can access it.

Figure 1:
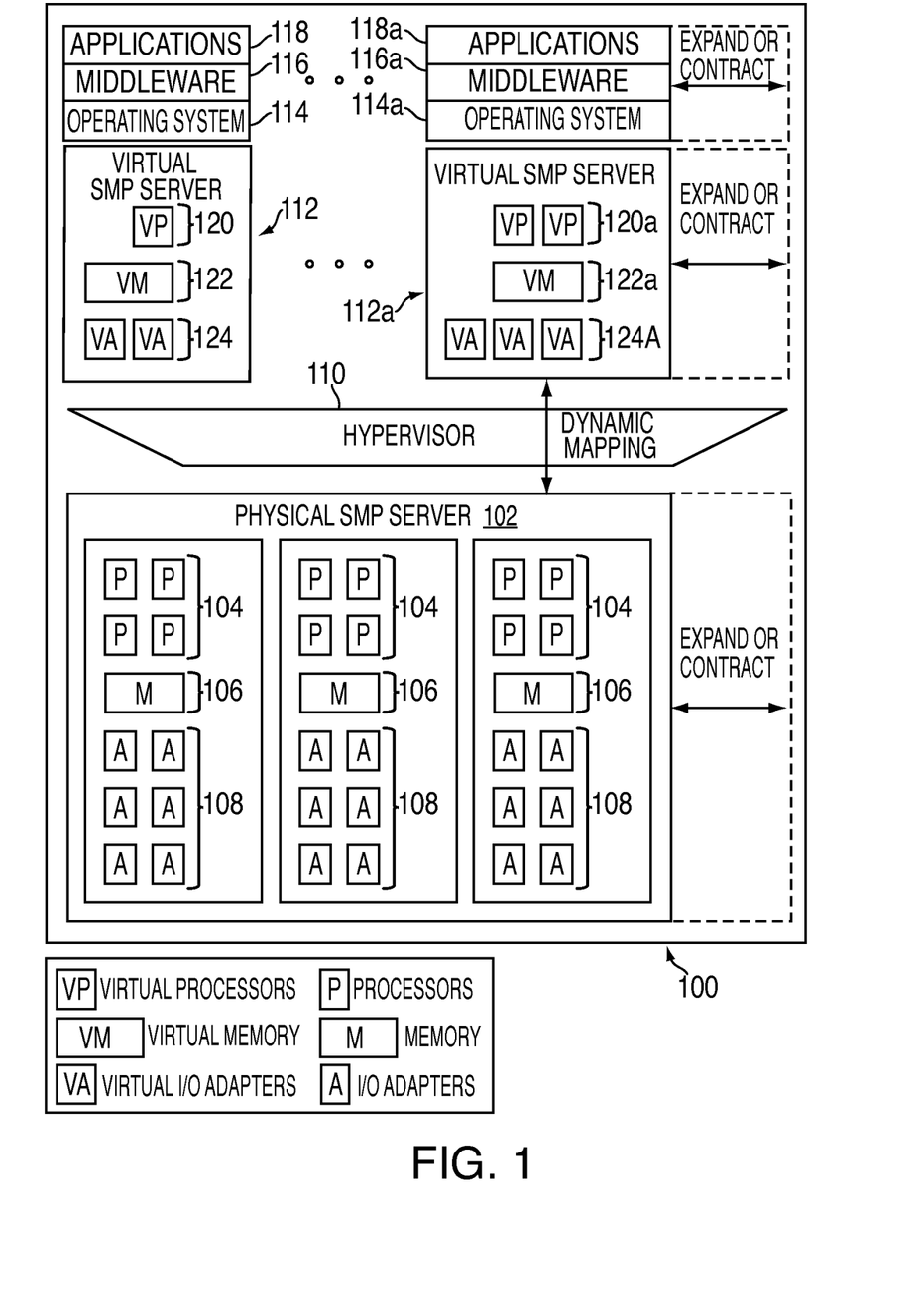
FIG. 1 depicts a block diagram of a data processing system that may be implemented by an exemplary embodiment.

FIG. 1 is a block diagram of a data processing system 100 in which an exemplary embodiment of the present invention may be implemented. In an exemplalry embodiment, system 100 is a symmetric multiprocessing (SMP) server computer system. The SMP server computer system 100 depicted in FIG. 1 includes physical hardware devices that can be mapped to, i.e. temporarily owned by, a user application to execute that application.

SMP server computer system 100 includes a physical SMP server 102 that includes physical hardware devices such as processors 104, memory 106, and I/O adapters 108. These physical devices are managed by a hypervisor 110 that resides on the physical SMP server computer system 100.

A virtual server is a proxy for a physical server that has the same capabilities, interfaces, and state. Virtual servers are created and managed by the hypervisor 100 and each virtual server appears to be a physical SMP server to its user (e.g., an operating system, middleware, and application software that run on it). The SMP server computer system 100 depicted in FIG. 1 includes one or more virtual servers such as virtual server 112 and virtual server 112a. Each virtual server 112 appears to its software to include its own processor(s), memory, and I/O adapter(s) that are available for the exclusive use of that virtual server 112. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server 112 supports its own software environment, including an operating system, middleware, and applications. The software environment of each virtual server 112 can be different from the software environment of other virtual servers. In an exempalry embodiment, the operating systems executed by each virtual server may differ from one another. For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server 112 is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. The hypervisor 110 manages the selections of physical devices and their temporary assignment to virtual devices.

The hypervisor 110 is responsible for dynamically creating, managing, and destroying virtual SMP servers. Whole virtual processors, virtual I/O adapters, and virtual memory blocks can be removed or added by hypervisor 110. The hypervisor 110 is also responsible for dynamic resource allocation, managing time-sharing of physical resources, and altering the physical resource mapped to a processor without involving the operating system. The hypervisor 110 is also able to dedicate physical resources to virtual resources for situations where sharing is not desired. The hypervisor 110 is responsible for managing the addition or removal of physical resources. The hypervisor 110 makes these additions and deletions transparent to the upper level applications.

Figure 2:
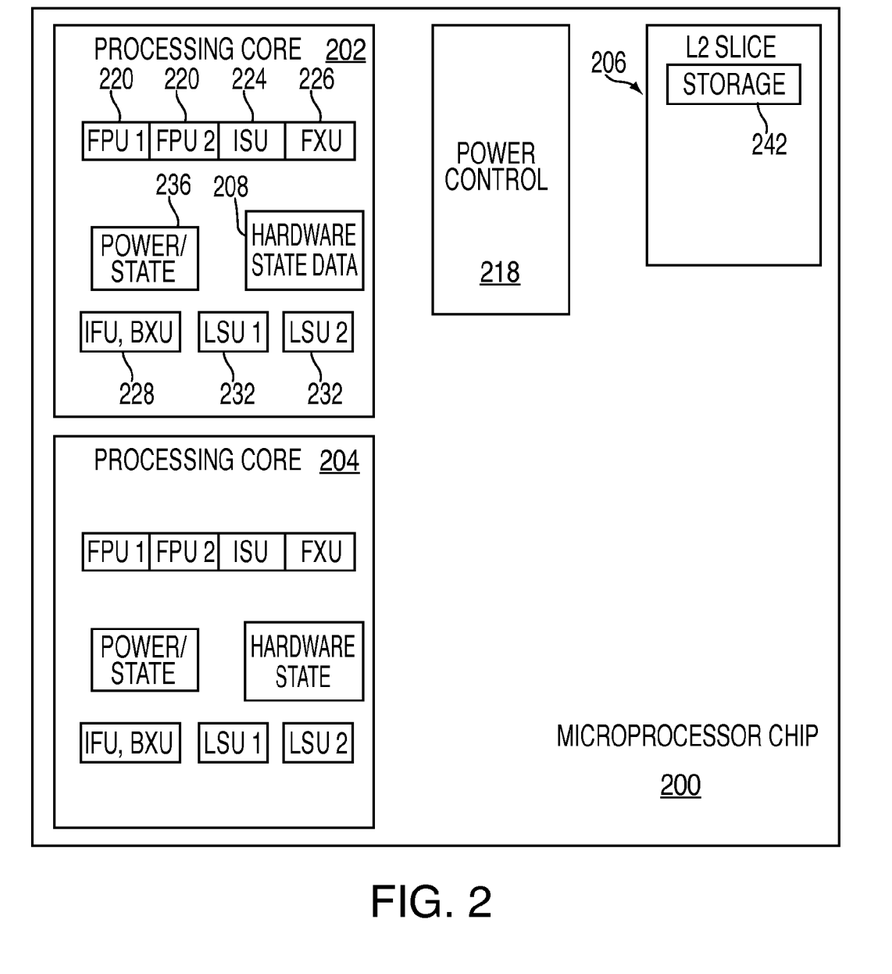
FIG. 2 depicts a block diagram of an integrated circuit that may be implemented by an exemplary embodiment.

FIG. 2 is a block diagram of an example of a microprocessor chip 200 that may be implemented by an exemplary embodiment. Microprocessor chip 200 includes processing core 202, processing core 204, an L2 cache 206, and a power control unit 218. In an exemplary embodiment, processing core 202, processing core 204, L2 cache 206, and power control unit 218 are hardware elements.

As used herein, the term "microprocessor chip" refers to a device that is fabricated using a single piece of silicon. The microprocessor chip may also be called a chip or an integrated circuit. One or more hardware elements are fabricated on the single microprocessor chip. The hardware elements generally include processing cores and caches, but may also include special functional elements such as compression engines, encryption engines, protocol processing engines, architecture emulation engines, and data stream processing engines. A processing core, such as processing core 202, may also include multiple sub-elements such as one or more floating point units 220, one or more load/store units 232, an instruction sequencing unit 224, a fixed point execution unit 226, an instruction fetch/branch execution unit 228, and possibly other sub-elements. The terms "processing core" and "processor" are used interchangeably herein to refer to the same device. As used herein, the term "physical processor" refers to a processing core and may include other hardware elements that are either dedicated to that core or shared by multiple cores. Thus, a physical processor is a processing core and hardware elements that are either dedicated to or shared by that processing core.

As used herein, the term "high power state" refers to a core that has been placed in a high clock frequency mode and the power state register 236 has been updated to reflect this mode. As used herein the term "high power core" refers to a processing core that is executing in a high power state. As used herein, the term "low power state" refers to a core that has been placed in a low clock frequency mode and the power state register 236 has been updated to reflect this mode. An exemplary embodiment uses changes in the core clock frequency as the means to adjust the power/performance of the various processing cores in the system. It should be understood that any other methods of adjusting the power/performance of the core may be used instead of, or in addition to, this clock frequency control. As used herein the term "lower power core" refers to a processing core that is executing in a lower power state.

As depicted in the exemplary embodiment depicted in FIG. 2, minimal hardware is added to each processing core 204 to provide for power/performance optimization. A single register, the power state register 236, indicates the power/performance state of the processing core 204 and can be read by a software instruction (e.g., in application code for use in deciding which code path to execute). In an exemplary embodiment, the power state register 236 is only written by power management software that has control of the power/performance parameters of the processing cores in the system. If the power mode of the core is changed then the power state register 236 must be updated. In an exemplary embodiment, the implementation of the power state register 236 is similar to a special purpose register and/or is written by a diagnose instruction. In an alternate exemplary embodiment, the power state register 236 is located in a register on the power control unit 218 or stored as one or more bits in the storage 242.

Also shown in the exemplary embodiment illustrated in FIG. 2 is hardware state data 208 which may be written to and read by one or more software instructions. In an exemplary embodiment, the hardware state data 208 includes information related to a current power and/or performance state in the processor. In an exemplary embodiment of a multi-processor system, the hardware state data 208 also includes information related to a current power and/or performance state in other processors in the multi-processor computer system. This information may include, but is not limited to, temperature and power states. In an exemplary embodiment, the hardware state data 208 is utilized to improve the performance of an application performing a task when the processor is operating in a high power mode. For example, when a dispatch algorithm is being executed, the hardware state data 208 may be utilized to determine which processor in the system the next task should be dispatched to. In this example, the hardware state data 208 may be referred to as partially processed dispatch information. In an exemplary embodiment, the hardware state data 208 is stored in a register such as a special purpose register and is written by the application code. In an alternate exemplary embodiment, the hardware state data 236 is stored on the power control unit 218 or stored as one or more bits in the storage 242. In an exemplary embodiment, the hardware state data 208 is stored in a location that the processor can access quickly. Storage locations that may be utilized to optimize high speed access by the processor when the processor is executing in a high speed mode include, but are not limited to, a general purpose register and a special purpose register.

As depicted in FIG. 2, the microprocessor chip 200 may also include a storage device. For example, L2 cache 206 includes storage 242. Storage 242 may be used to store hardware state information for element 206 prior to element 206 being powered-off. In addition, the storage 242 (also referred to herein as memory) may store computer instructions to perform the processing described herein. As described previously, the storage 242 may include one or both of the power state register 236 and the hardware state data 208. Storage 242 may also be used to store default state information or initialization information for the element.

Figure 3:
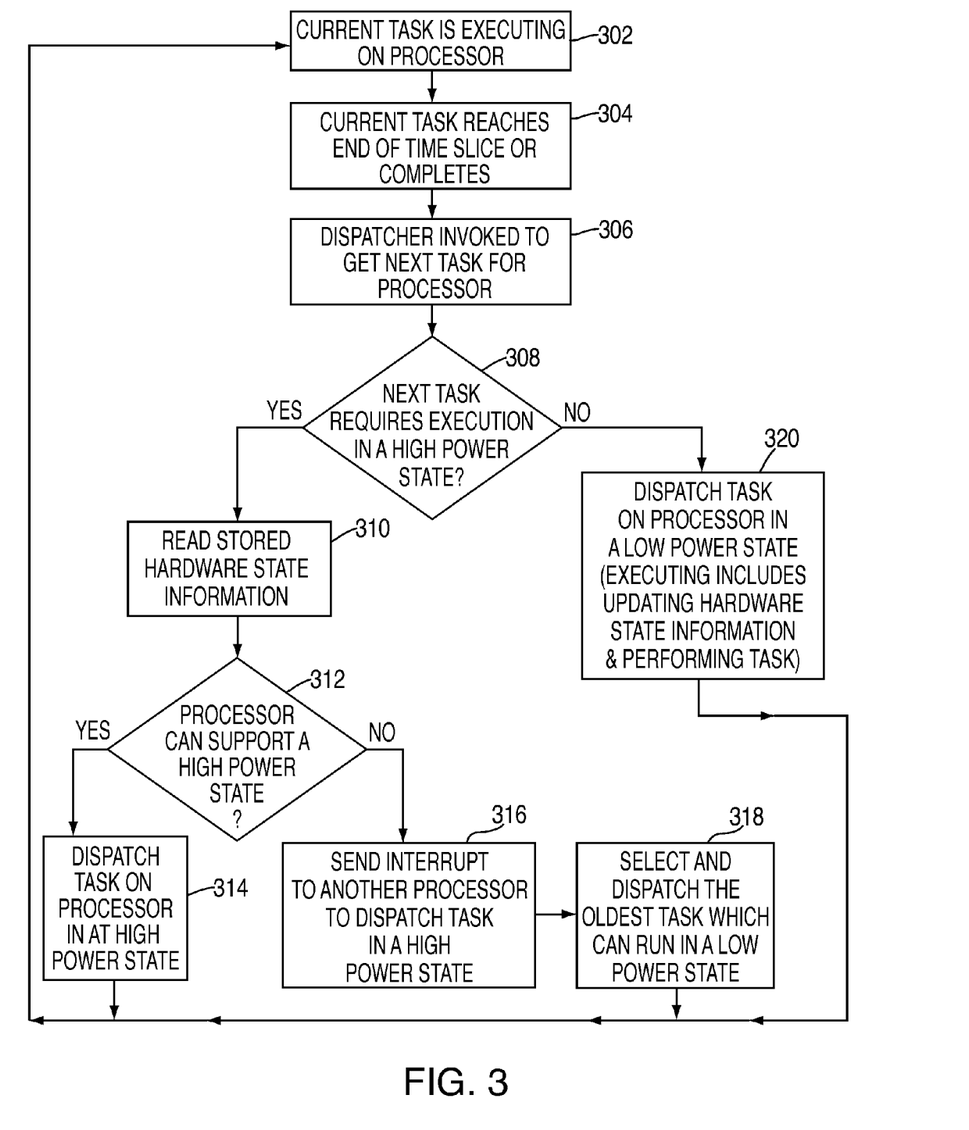
FIG. 3 depicts a process flow of a dispatch algorithm that may be implemented by an exemplary embodiment.

FIG. 3 depicts a process flow of a dispatch algorithm that may be implemented by an exemplary embodiment. In an exemplary embodiment, the algorithm is executed by the hypervisor 110 which is responsible for implementing the virtual servers in a data processing system, including managing the time-sharing of physical processors among many different virtual processors. At block 302, a current task is executing on a physical processor, such as processing core 202. In an exempalry embodiment, the hypervisor 110 has dynamically assigned a virtual processor to the processing core 202 and its associated hardware elements, which are used to execute the virtual processor. In this embodiment, the hypervisor 110 has defined the virtual processor used by the partitions as "shared." At block 304, the current task being executed by the virtual processor reaches the end of a time slice and/or the task completes. In an exemplary embodiment, the hypervisor 110 sets a time limit when a virtual processor is assigned to a physical processor. The physical processor then executes the virtual processor until the time limit, also called a time slice, expires. As shown at block 306, control of the processing core 202 reverts back to the dispatcher portion of the hypervisor 110 which then selects the next virtual processor to be assigned, or dispatched, to this processing core 202.

In an exemplary embodiment, a determination is made as to whether to alter the power state of a hardware element or sub-element at the time that hardware elements and sub-elements are assigned to a virtual server. At block 308, it is determined if the task to be performed by the next virtual processor assigned to the processing core 202 requires execution in a high power state. The next virtual processor may require the high power state, for example, to meet a quality of service (QOS) threshold. Additionally, selected tasks to be performed by the virtual processor may not require a high power state. The dispatching code may determine that all tasks are currently meeting their QOS requirements and the system does not need to use additional power to speed up the computations for any of these same tasks.

If it was determined, at block 308, that the next task requires execution in a high power state, then block 310 is performed to read the hardware state data 208. At block 312, it is determined if the processing core 202 can support a high power state. This determination uses the hardware state data 208 as input so that the determination can be made prior to altering the power state for the processing core 202. If it is determined at block 312, that the processing core 202 can support a high power state, then block 314 is performed to move the processing core 202 into a high power state (if it is not already in the high power state). Also as part of block 314, the task is dispatched to the processing core 202 and executed in a high power state on the processing core 202. In an exemplary embodiment, the software instructions associated with the task being executed may also read hardware state data 208.

If it is determined at block 312, that the processing core 202 cannot support a high power state, then block 316 is performed to send an interrupt to another processor that can support a high power state. The interrupt causes the task to be dispatched on the other processor. In an exemplary embodiment, the other processor is selected based on information (e.g., current power state of the other processor) contained in the hardware state data 208. In an alternate exemplary embodiment, when it is determined at block 312, that the processing core 202 cannot support a high power state, the task is performed in a low power state in response to logic in the dispatcher and/or the availability of processors that can support a high power state. The information about the availability of processors that can execute in a high power state may be found in the hardware state data 208. In a further exempalry embodiment, the availability of processors that can be executed in a high power state is determined based on the cumulative power required by all (or a subset) of the processors in the multi-processor system (e.g., stored in the hardware state data 208), or some other cumulative power related measurement such as temperature.

Block 318 is performed after, in parallel with, or before block 316. At block 318, another task is selected and dispatched on the processor in a low power state. In an exemplary embodiment, the task that is selected is the oldest task waiting for execution that may be executed in a low power state. In other embodiments, other criteria (e.g., highest priority, etc.) may be utilized to select the next task to be executed in a low power state.

If it was determined, at block 308, that the next task does not require execution in a high power state, then block 320 is performed and the task is dispatched to the processing core 202 in a low power state. At block 320, pre-processing information is collected and stored in the hardware state data 208 and the task is executed. In an exemplary embodiment, collecting the pre-processing information, or hardware state data 208, includes collecting power state and other power/performance related data from other processing cores within the multi-processor system. The hardware state data may be used by the dispatcher in deciding whether a processing core can be put into a high power mode and/or for selecting another processing core to perform the task.

Figure 4:
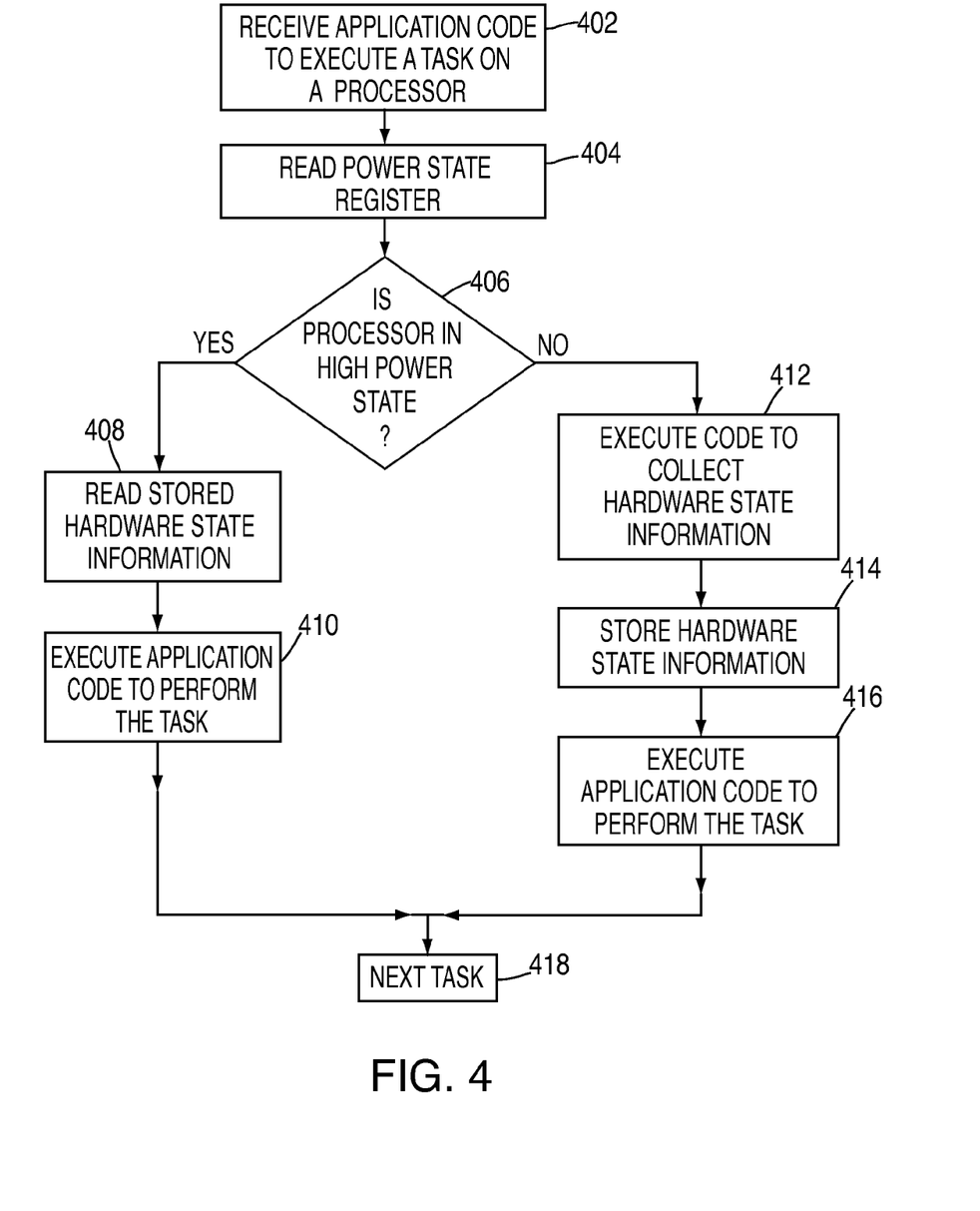
FIG. 4 depicts a process flow that may be implemented by an exemplary embodiment for executing different software paths based on a power level of a processor.

FIG. 4 depicts a process flow that may be implemented by exemplary embodiments for executing different software paths based on the power level of the processor executing the software. In an exemplary embodiment, the process is implemented by application code executing on a processor. At block 402, application code to perform a task is received at a processor, such as processing core 202. At block 404, the application code reads the contents of the power state register 236 on the processing core 202. If the power state is a high power state, as determined at block 406, then block 408 is performed and the hardware state data 208 is accessed by the application code. At block 410, the application code is executed to perform the task using any applicable hardware state data 208. As described previously, in exemplary embodiments, the hardware state data 208 contains pre-processing information that is utilized to expedite the execution of the application code when it executing on processor that is in a high power state. In this manner, power efficiency is improved because less time, and therefore less power, is required by the task executing in the high power mode. Processing continues with the next task at block 418.

If the power state is not a high power state, as determined at block 406, then block 412 is performed to execute a code path that collects hardware state data 208 for the current processing core 202 or another processing core in the multi-processor system. In this embodiment, the type of data collected is related to power/performance, other embodiments include any data that will result in improved power efficiency in the multi-processor system being collected. At block 414, the hardware state data 208 is stored. At block 416, the application code to perform the task is executed. Processing continues at block 418 with the next task.

A wide variety of hardware state data may be collected by any number of alternative embodiments. This data may include, but is not limited to, the power state of other microprocessor cores in the system, the power state of memory DIMMs, the power state of I/O devices, cache miss rate data, component temperatures, or cache power states. A wide range of preprocessing algorithms may also be used. The state data may compared with previously collected historical data to look for known trends. After the preprocessing, the state data is summarized in a final data format that is tailored for easy and fast consumption by the hypervisor dispatching code.

In an alternate exemplary embodiment, the application code includes additional decision points to insure that the code path that includes blocks 412 and 416 is exercise a minimum number of times per time unit (e.g., per second) regardless of the contents of the power state register 236. Doing this may result in the hardware state data 208 having the most reliable and up-to date information for use by the processor when it is executing the high power state path (e.g., blocks 408 and 410).

In a further exemplary embodiment, more than two power state paths are supported. For example, there may be three different paths, one for a high, medium, and low power state.

Technical effects and benefits include the ability to improve power efficiency by providing pre-processed information for application code executing on a processor in a high power state. This may lead to a decrease in power usage in a multi-processor system or in an increase in the amount of processing that can be performed by the multi-processor system while still remaining within a power usage threshold.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
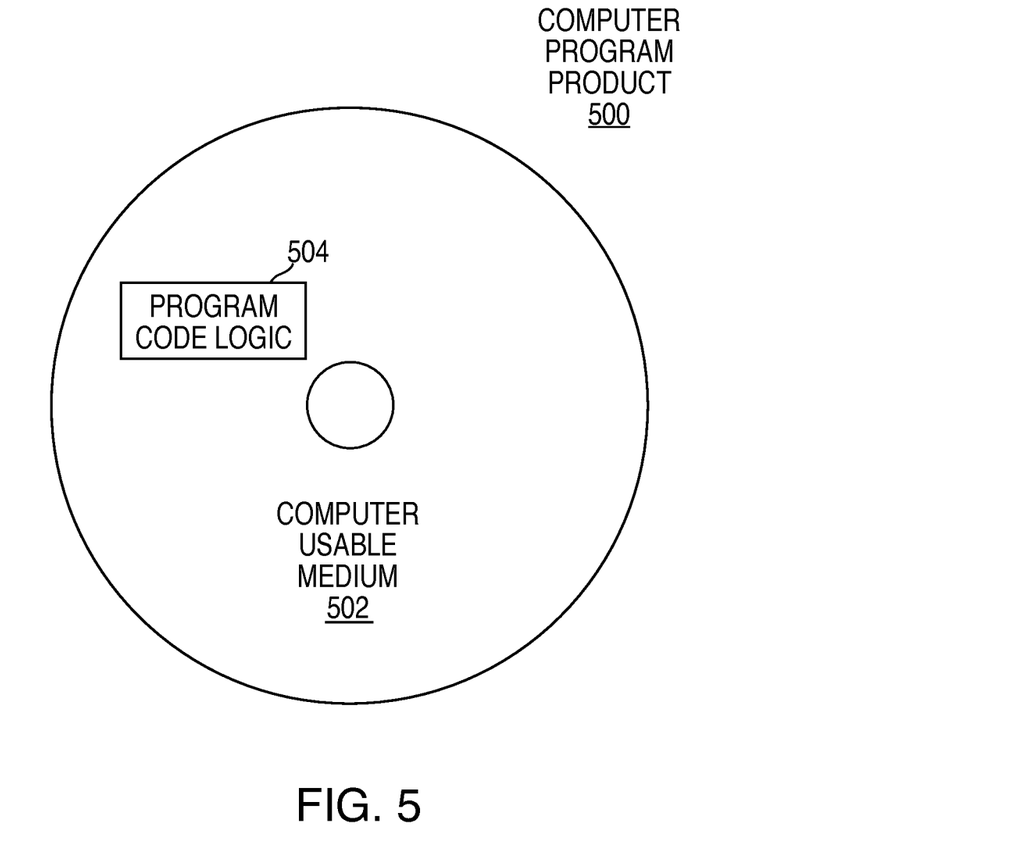
FIG. 5 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product comprising:
a non-transitory tangible storage medium readable by a processing circuit and storing instructions for execution by the processing circuit for performing a method of executing low power code path instructions or high power code path instructions on a first processor in a computing system that comprises a plurality of processors, the method comprising:
receiving an application code configured to perform a first task on the first processor, the application code comprising a first path through the application code, the first path comprising the low power code path instructions corresponding to the first task, the application code further comprising a second path through the application code, the second path comprising the high power code path instructions corresponding to the first task, the first path being distinct from the second path;
determining whether a current power state of the first processor is a low power state or a high power state based on contents of a power state register of the first processor;
based on determining that the current power state of the first processor is the low power state, executing the low power code path instructions of the application code on the first processor, the executing the low power code path instructions by the first processor comprising:
collecting pre-processing information, the pre-processing information comprising power and performance state information from the plurality of processors in the computing system;
storing the pre-processing information as hardware state data; and
executing the low power code path instructions of the first path through the application code to perform the first task; and
based on determining that the current power state of the first processor is the high power state, executing the high power code path instructions on the first processor, the executing the high power code path instructions by the first processor comprising:
accessing the hardware state data; and
based on the accessed hardware state data, executing the high power code path instructions of the second path through the application code to perform the first task.

2. The computer program product of claim 1, the hardware state data including temperature information of the plurality of processors in the computing system.

3. The computer program product of claim 1, further comprising selecting a location for storing the hardware state data that is optimized for high speed access by the first processor when it is executing the high power state instructions.

4. A computer implemented method for executing low power code path instructions or high power code path instructions on a first processor in a computer system that comprises a plurality of processors, the method comprising:
receiving an application code configured to perform a first task on the first processor, the application code comprising a first path through the application, the first path code comprising the low power code path instructions corresponding to the first task, the application code further comprising a second path through the application code, the second path comprising the high power code path instructions corresponding to the first task, the first path being distinct from the second path;
determining whether a current power state of the first processor is a low power state or a high power state based on contents of a power state register of the first processor;
based on determining that the current power state of the first processor is the low power state, executing the low power code path instructions of the application code on the first processor, the executing the low power code path instructions by the first processor comprising:
collecting pre-processing information, the pre-processing information comprising power and performance state information from the plurality of processors in the computing system;
storing the pre-processing information as hardware state data; and
executing the low power code path instructions of the first path through the application code to perform the first task; and
based on determining that the current power state of the first processor is the high power state, executing the high power code path instructions on the first processor, the executing the high power code path instructions by the first processor comprising:
accessing the hardware state data; and
based on the accessed hardware state data, executing the high power code path instructions of the second path through the application code to perform the first task.

5. The method of claim 4, the hardware state data including temperature information of the plurality of processors in the computing system.

6. A system for executing low power code path instructions or high power code path instructions on a first processor in a computer system, the computer system comprising:
a plurality of processors;
a computer memory; and
a hypervisor in communication with the computer memory, wherein a dispatch algorithm is executable by the hypervisor, and an application code is part of the dispatch algorithm;
wherein the computer system is configured for performing a method comprising:
receiving the application code configured to perform a first task on the first processor, the application code comprising a first path through the application code, the first path comprising the low power code path instructions corresponding to the first task, the application code further comprising a second path through the application code, the second path comprising the high power code path instructions corresponding to the first task, the first path being distinct from the second path;

determining whether a current power state of the first processor is a low power state or a high power state based on contents of a power state register of the first processor;

based on determining that the current power state of the first processor is the low power state, executing the low power code path instructions of the application code on the first processor, the executing the low power code path instructions by the first processor comprising:

collecting pre-processing information, the pre-processing information comprising power and performance state information from the plurality of processors in the computing system;

storing the pre-processing information as hardware state data; and executing the low power code path instructions of the first path through the application code to perform the first task; and based on determining that the current power state of the first processor is the high power state, executing the high power code path instructions on the first processor, the executing the high power code path instructions by the first processor comprising:

accessing the hardware state data; and based on the accessed hardware state data, executing the high power code path instructions of the second path through the application code to perform the first task.

7. The system of claim 6, the hardware state data including temperature information of the plurality of processors in the computing system.

8. The method of claim 4, further comprising selecting a location for storing the hardware state data that is optimized for high speed access by the first processor when it is executing the high power state instructions.

9. The system of claim 6, further comprising selecting a location for storing the hardware state data that is optimized for high speed access by the first processor when it is executing the high power state instructions.

10. The computer program product of claim 1, further comprising:

determining by a hypervisor that a second task requires a processor in the high power state;

determining by the hypervisor, based on the hardware state data, that the first processor is capable of supporting the high power state;

based on the first processor being in the low power state and the first processor being capable of supporting the high power state, moving the first processor to the high power state;

updating the power state register of the first processor based on moving the first processor to the high power state; and performing the second task by the first processor in the high power state.

11. The method of claim 4, further comprising:

determining by a hypervisor that a second task requires a processor in the high power state;

determining by the hypervisor, based on the hardware state data, that the first processor is capable of supporting the high power state;

based on the first processor being in the low power state and the first processor being capable of supporting the high power state, moving the first processor to the high power state;

updating the power state register of the first processor based on moving the first processor to the high power state; and performing the second task by the first processor in the high power state.

12. The system of claim 6, further comprising:

determining by the hypervisor that a second task requires a processor in the high power state;

determining by the hypervisor, based on the hardware state data, that the first processor is capable of supporting the high power state;

based on the first processor being in the low power state and the first processor being capable of supporting the high power state, moving the first processor to the high power state;

updating the power state register of the first processor based on moving the first processor to the high power state; and performing the second task by the first processor in the high power state.

* * * * *